United States Patent [19]

Nyc

[11] 4,358,687
[45] Nov. 9, 1982

[54] WIND POWERED GENERATOR

[76] Inventor: Wladimir Nyc, 5254 San Jose Blvd., Jacksonville, Fla. 32207

[21] Appl. No.: 202,936

[22] Filed: Nov. 3, 1980

[51] Int. Cl.³ .............................................. F03D 5/02
[52] U.S. Cl. ...................................... 290/44; 290/55; 416/7
[58] Field of Search ...................... 290/43, 44, 54, 55; 415/5; 416/7, 9, 23, 117

[56] References Cited

U.S. PATENT DOCUMENTS

| | | | |
|---|---|---|---|
| 2,352,089 | 6/1944 | Fagerlund | 416/9 |
| 3,902,072 | 8/1975 | Quinn | 290/44 |
| 3,957,390 | 5/1976 | Miller | 416/7 X |
| 4,186,314 | 1/1980 | Diggs | 290/55 |
| 4,292,535 | 9/1981 | Diggs | 290/54 |

*Primary Examiner*—J. V. Truhe
*Assistant Examiner*—W. E. Duncanson, Jr.

[57] ABSTRACT

A wind driven device capable of generating electrical power or performing other useful work by transforming wind energy into a rotational power source.

2 Claims, 5 Drawing Figures

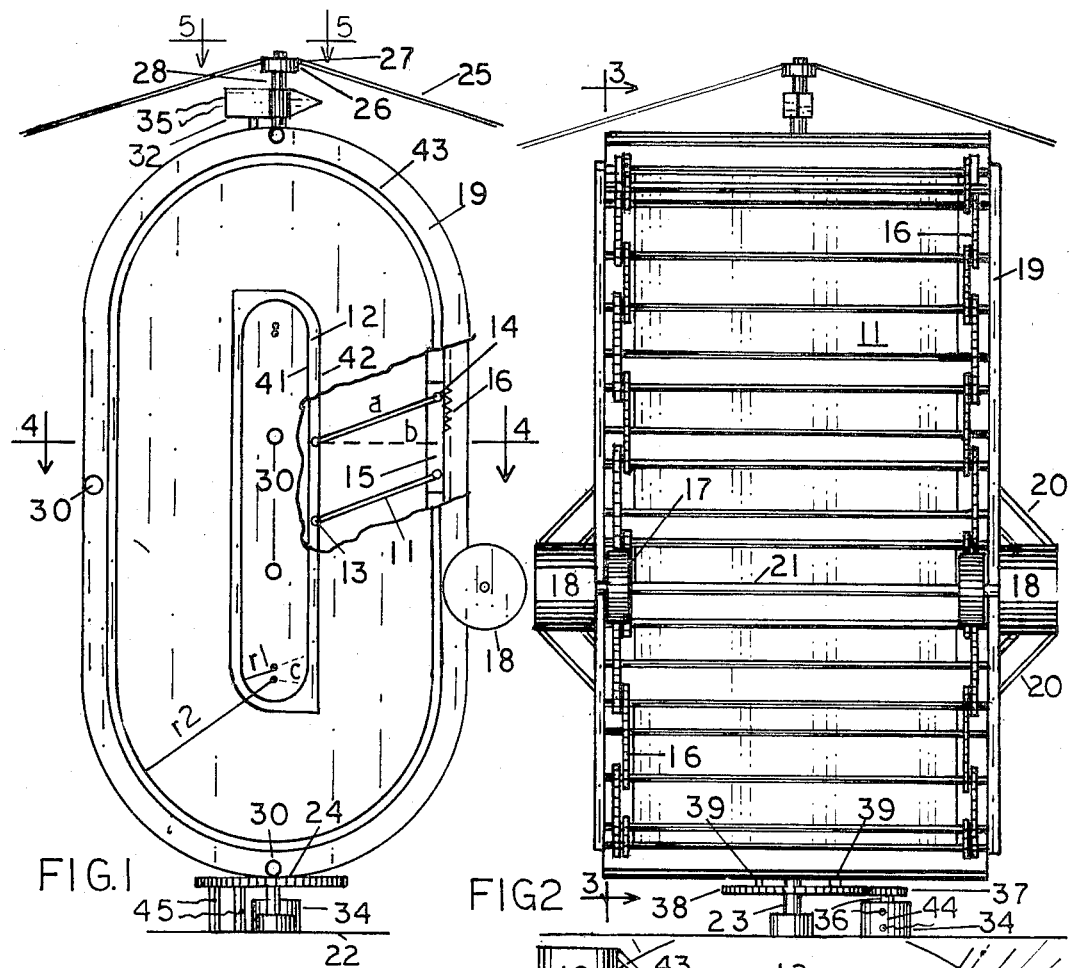
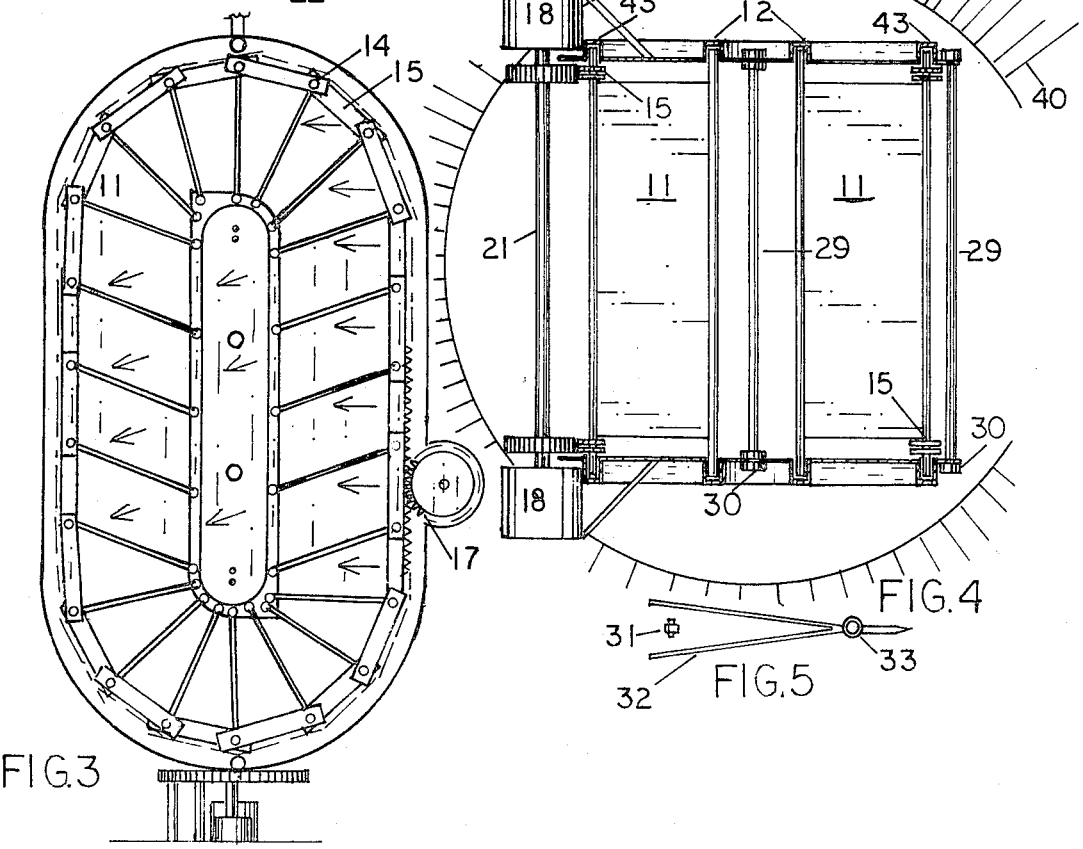

WIND POWERED GENERATOR

SUMMARY OF THE INVENTION

The invention relates in general to electrical power generator devices and particularly to wind driven electrical power generator devices.

This wind powered generator device is unique in that it permits the efficient and practical use of wind blades with very large surface areas which in turn more fully utilize available wind energy.

It is the primary object of the invention to provide a device and method to utilize energy from wind to produce electricity or to perform other useful work more efficiently, over a wider range of wind conditions, and in larger quantities than other presently known wind powered generator devices.

It is another object of the invention to provide a device and method for avoiding certain limitations inherent in prior applications of wind powered generator devices.

Other objects together with the foregoing are attained in the embodiments of the invention described in the accompanying description and illustrated in the accompanying drawings.

SHORT DESCRIPTION OF THE FIGURES

FIG. 1 is a side elevational view of the wind powered generator, with portions broken away to reveal certain interior detail;

FIG. 2 is a front elevational view of the device of FIG. 1;

FIG. 3 is a sectional side view of the device of FIG. 2, taken on the line 3—3 in FIG. 2;

FIG. 4 is a top sectional view of the device of FIG. 1, taken on the line 4—4 in FIG. 1; and FIG. 5 is a top fragmentary sectional view, to an enlarged scale, of a portion of the device of FIG. 1, the plane of the section being indicated by the lines 5—5 in FIG. 1.

DETAILED DESCRIPTION OF THE PREFERRED EMBODIMENT

Rotational movement of blades 11 about elongated orbital slot 12 is provided by the vertical component of wind acting against the said blades. Wind passing across the device will provide lift (upward displacement) of the blades when acting against said blades on the windward side of the device and push (downward displacement) of the blades when acting against said blades on the leeward side of the device. Blades 11 maintain an optimum angle or attitude to intercept wind due to the unique features described below. Frictionless bearings 13, connected to blades 11, are rotatably mounted to ride freely in elongated orbital slot 12. Elongated orbital slot 12 is defined by inner slot wall 41 and outer slot wall 42. Frictionless bearing connections 14, connecting blades 11 with sectional members 15, are rotatably mounted in elongated orbital slot 43. Assuming a counterclockwise rotation of blades 11, as viewed in FIG. 1 and FIG. 2, it should be noted that outer slot wall 42 has a distorted slot width between inner wall 41 and outer wall 42 in the upper left hand portion and in the lower right hand portion of its elongated orbital axis. It should also be noted that radius r 1 and radius r 2 have different centers of radii. Therefore distance C must be less than or equal to distance A minus distance B. Blades 11, when on the windward side of their rotational axis, are positioned to provide lift or upward displacement. As blades 11 reach the top position of their elongated orbital rotation, said blades are positioned at or near a vertical attitude. As said blades reach the upper left hand portion of elongated orbital slot 12, gravitational forces acting on blades 11 cause said blades to be repositioned so that they will provide push or downward displacement while on the leeward side of their rotational axis. As blades 11 reach the bottom position of their elongated orbital rotation, said blades are positioned at or near an inverted vertical attitude. As said blades reach the lower right hand portion of elongated orbital slot 12, gravitational forces acting on blades 11 cause said blades to be repositioned so that they will again provide lift or upward displacement while on the windward side of their rotational axis. Rotational movement of blades 11 cause similar rotation of sectional members 15 with beveled gear teeth 16. Sectional members 15 rotate about elongated orbital slot 43. Beveled gear teeth 16 engage beveled gears 17 thereby providing a power source to rotate electricity producing generators 18 or to perform other useful work. Generators 18 are suitably mounted on frame 19 by braces 20. Generators 18 always operate cooperatively through common shaft 21. Frame 19 is suitably mounted on platform 22 through shaft 23, gears 38 and rigid connectors 39. Frame 19 is steadied by guy wires 25 through shaft 26 and guy wire connectors 27 and frictionless bearing 28. Frame stiffeners 29 are connected to frame 19 through rigid connectors 30.

Orientation of the wind powered generator device so that said device is always facing directly into the wind is achieved in the manner described below. Electrical switch 31 is rigidly connected to shaft 26. Wind vane 32 is mounted on shaft 26 by frictionless bearing 33. Wind vane 32 always seeks to point directly into the wind. If the wind powered generator device is oriented otherwise than directly into the wind, then wind vane 32 contacts electrical switch 31 on the windward side. Electrical switch 31 in turn activates directional drive motor 34 through electrical wires 35 and contacts 44. Directional drive motor 34 with power source 45 then rotates the wind powered generator device through shaft 36, gears 37, gears 38 and rigid connectors 39. Rotation continues until electrical switch 31 breaks contact with wind vane 32. Now both wind vane 32 and the wind powered generator device are oriented directly into the wind for optimum efficiency. Wind deflector cone 40 shields the lower portion of the wind powered generator device so as to prevent resistance of blades 11, when said blades are moving into the direction of the wind at the lower orbital position of rotation.

From the foregoing, it can be seen that this wind driven electrical power generator device may be used to efficiently produce electricity. It can also be seen that the device, by providing a rotational power source, may be used to perform other useful work.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling into the scope of the invention as claimed.

What is claimed is:

1. A wind driven electrical power generator device comprising:
   a. A frame
   b. An inner elongated orbital slot mounted about a central elongated vertical axis of said frame
   c. An outer elongated orbital slot mounted about same central elongated vertical axis of aforesaid frame
   d. A plurality of blades rotatably mounted between inner elongated orbital slot and outer elongated orbital slot
   e. A connection means for said plurality of blades to rotate freely about aforesaid central elongated vertical axis while properly positioned between inner elongated orbital slot and outer elongated orbital slot
   f. Aforesaid inner elongated orbital slot, having a distorted slot width at strategic locations near the top and bottom orbital positions to permit said plurality of blades to maintain an optimum attitude to intercept wind throughout their rotation about said central elongated vertical axis
   g. A continuous gear train rotatably mounted about said outer elongated orbital slot
   h. A connection means for said continuous gear train with aforesaid plurality of blades, so that continuous gear train rotates freely with plurality of blades about aforesaid central elongated vertical axis
   i. An electrical power generator
   j. A means to engage said continuous gear train with said generator to rotate said generator thereby producing electricity.

2. A wind powered generator as in claim 1 with motorized, automatic means of maintaining an optimum orientation by always pointing directly into the wind.

* * * * *